United States Patent [19]

Fischbach

[11] 4,387,484
[45] Jun. 14, 1983

[54] SUPPORTING BRACKET FOR SIDE HANDLES OF UTENSILS

[75] Inventor: Wolfgang Fischbach, Daaden, Fed. Rep. of Germany

[73] Assignee: Heinrich Baumgarten KG Eisen- und Blechwarenfabrik, Neunkirchen, Fed. Rep. of Germany

[21] Appl. No.: 240,709

[22] Filed: Mar. 5, 1981

[30] Foreign Application Priority Data

Mar. 14, 1980 [DE] Fed. Rep. of Germany ....... 3009766
Mar. 25, 1980 [DE] Fed. Rep. of Germany ... 8008180[U]

[51] Int. Cl.³ .............................................. A47J 45/10
[52] U.S. Cl. ................................. 16/114 A; 16/110 A
[58] Field of Search .............. 16/110 R, 110 A, 110.5, 16/111 R, 119, DIG. 24, DIG. 25, 114 R, 114 A, DIG. 12

[56] References Cited

U.S. PATENT DOCUMENTS

| | | | |
|---|---|---|---|
| 2,615,226 | 10/1952 | Kral | 16/114 R |
| 3,438,082 | 4/1969 | Jones et al. | 16/114 A |
| 3,883,169 | 5/1975 | Fischbach | 16/114 A X |
| 4,127,914 | 12/1978 | Fischbach | 16/114 A X |
| 4,200,323 | 4/1980 | Cocksedge | 16/114 R X |

*Primary Examiner*—Paul A. Bell
*Assistant Examiner*—John S. Brown
*Attorney, Agent, or Firm*—Flynn, Thiel, Boutell & Tanis

[57] ABSTRACT

A handle apparatus for a utensil includes a supporting bracket secured to a wall of the utensil and having a leg projecting away from the utensil, a handle having a recess therein for receiving the leg, and a retaining mechanism disposed in the handle recess and cooperable with the leg for releasably securing the handle on the utensil. The leg includes spaced first and second portions which project outwardly from the utensil well, a third portion extending between the outer ends of the first and second portions, and fourth and fifth portions respectively provided at the inner ends of the first and second portions and secured to the utensil wall. The first and second portions converge away from the utensil wall and the third portion is approximately parallel to the utensil wall, so that the leg is of generally trapezoidal shape.

6 Claims, 8 Drawing Figures

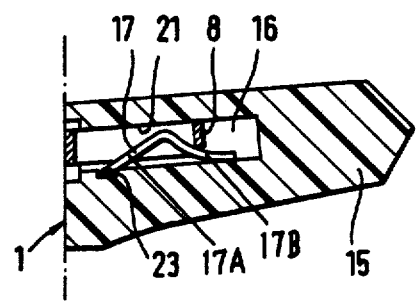
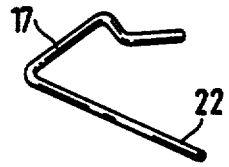
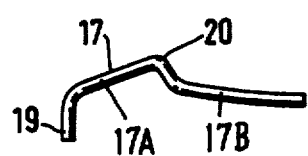
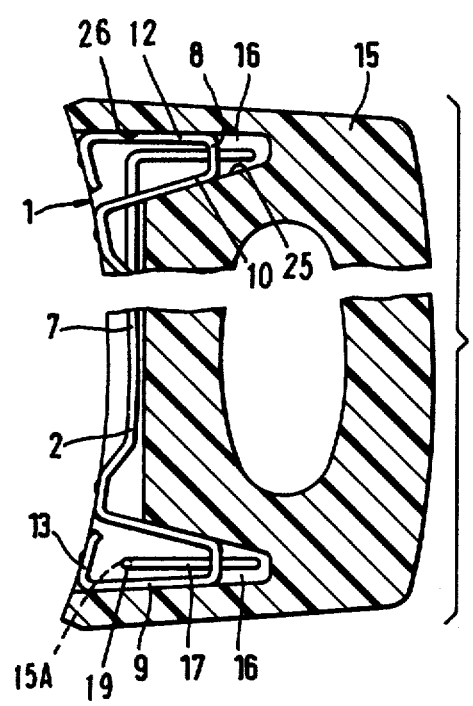
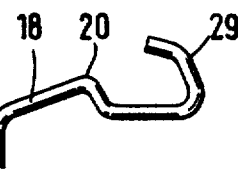

4,387,484

SUPPORTING BRACKET FOR SIDE HANDLES OF UTENSILS

FIELD OF THE INVENTION

The invention relates to a supporting bracket for side handles for a utensil and, in particular, to a bracket which includes a sheet metal strip bent to a substantially U-shaped form and having at its face at least two welding buttons or projections.

BACKGROUND OF THE INVENTION

The side handle supporting bracket described hereinbefore is secured to utensils by projection welding. For this purpose it is necessary to press the welding projections with adequate pressure against the utensil wall. For this purpose the supporting bracket is put into a welding mould which usually has two movable welding fingers which serve as abutments for the welding projections and press the bracket against the utensil wall. The welding of the supporting bracket to the utensil handle is effected by resistance spot welding at the places on the supporting bracket which are provided with welding projections. It is necessary to have a bracket adapted to the radius of the utensil for each utensil diameter, otherwise the utensil wall is subjected to severe stress when the bracket is welded-on, which may lead to deformation of the utensil. Moreover, in the case of the known supporting brackets the load-accepting ability parallel to the utensil wall is relatively slight, which may lead to damage to the handle during use or on assembly of large utensils. The welding mould is also relatively complicated owing to the movable parts. Also, these movable welding fingers produce the accompanying disadvantage that the welding operation is in such a case prolonged by the necessary closing and opening movements of the welding fingers. Moreover the service life thereof is shortened because of the movable parts.

The invention has as its primary object the provision of a supporting bracket of the kind mentioned initially wherein the welding of the supporting bracket and utensil wall requires simply a welding mould without moving parts, into which the supporting bracket simply has to be laid, so that the time for welding can be reduced, wherein the supporting bracket has a relatively improved strength, and wherein one supporting bracket is suitable for a range of utensil diameters and for automatic feeding to the welding mould.

SUMMARY OF THE INVENTION

This object is achieved according to the invention in that the two legs of the supporting bracket are each bent over outwardly to form projecting bracket legs, so that the outer leg portion extends approximately parallel to the inner leg portion, that the forward free end of the projecting outer bracket portion is inwardly bentover and is situated approximately in alignment with the connecting web portion for the legs, that the free end of the leg is offset in a plane situated approximately at right angles thereto relatively to the connecting web portion, and that the welding projections on the connecting web portion of the legs and the said free portion are arranged offset relatively to one another in the last-mentioned plane.

The welding projections, which are situated in a line which corresponds to the contour of the utensil wall, are offset relative to one another in height because of the particular form of the supporting bracket, so that the welding projections can be supported directly by the welding mould without special displaceable fingers etc. being required. The welding mould can be constructed as a so-called simple lay-in mould, and the welding projections can be subjected to high pressure since they are directly supported, which reduces the necessary welding time and improves the quality of the welded result.

Since the welding projections of a projecting bracket portion of the supporting bracket are arranged offset relatively to one another, whereby a supporting effect on the utensil is obtained, the supporting bracket can be loaded with relatively large forces at right angles to the utensil. Since the projecting bracket portions are flexible the welding projection spacing can be varied, so that one supporting bracket can be used with different utensil diameters without straining the wall of the utensil. When using conventional supporting brackets and thin utensil walls, with supporting brackets not adapted to the utensil diameter it may happen that the utensil is so distorted that the lid can no longer be put on the utensil satisfactorily.

Because of the rigid lattice construction of the supporting bracket according to the invention the material thickness can be reduced by about 20% and it is fully guaranteed that all forces which occur are taken up adequately.

According to a further proposal of the invention the supporting bracket is secured with four welding projections to the utensil, which further improves strength and stability. Constructing the supporting bracket with projecting bracket portions also gives improved lateral stability, which is particularly important during factory transporting of the utensil blanks. Since the supporting bracket is also of symmetrical construction it is possible for it to be fed-in automatically to the welding mould, since the parts cannot hook into one another.

According to a further constructional form of the invention the free end of the leg can be bent-over inwards a further time, so that it again extends parallel to the first leg portion and can abut against it. This prevents the openings of the projecting bracket legs from becoming undesirably reduced in size even when the external pressure is relatively large. This is particularly important for enamelling, since the enamel does not form bridges when the projecting bracket legs have an adequate size. Material thicknesses can be reduced because of the improved strength, which affords advantages in the case of enamelling.

BRIEF DESCRIPTION OF THE DRAWINGS

A constructional example of the invention is described in detail hereinafter with the help of the drawings, wherein:

FIG. 4 is a sectional view from above of a side handle which is mounted by means of a supporting bracket according to the invention and two springs.

FIG. 5 shows a cross-section through FIG. 4, and

FIGS. 6 to 8 show three different embodiments of the springs for securing the handle to the utensil.

DETAILED DESCRIPTION

Figure 1:
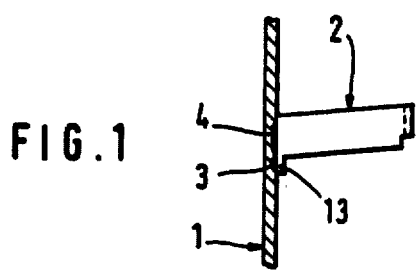
FIG. 1 is a sectional side view of a wall of a utensil with a supporting bracket according to the invention secured to the said wall.

In FIG. 1, 1 designates the utensil wall of e.g. a cooking utensil. The supporting bracket 2 constructed as proposed according to the present invention is secured to this utensil wall by means of four welding projections 3 to 6. The U-shaped supporting bracket 2 comprises a connecting web portion 7 which connects to one another the two legs 8,9 each forming a projecting bracket portion. The connecting web portion 7 is given approximately the curvature of the utensil wall 1.

Figure 2:
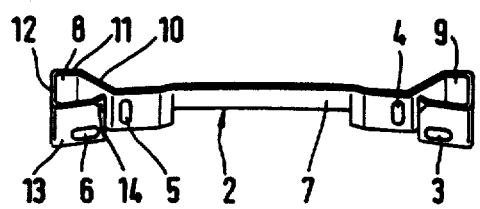
FIG. 2 is a perspective view of a supporting bracket according to the invention.

The legs 8, 9 are constructed so as to constitute projecting bracket elements or box-shaped structures. They comprise a rearwardly projecting portion 10, a portion 11 disposed approximately at right angles thereto, a portion 12 which again extends approximately parallel to the portion 10, and a free end 13 which as seen from above is aligned in a manner corresponding to the connecting web portion 7. As FIG. 2 shows, this free end extends below the connecting web portion 7 and comprises a welding projection 6. Since this portion of the free end 13, and also the rear side of the welding projection 5, is freely accessible from the rear, the supporting bracket 2 can be placed in an appropriately constructed mould the surfaces of which abut directly on the rear sides of the welding projections 5 and 6. The supporting bracket is also of symmetrical construction.

Figure 3:
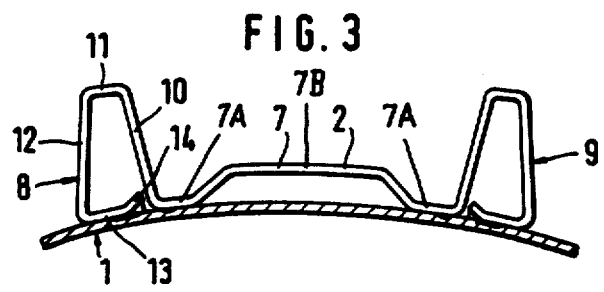
FIG. 3 is a sectional view from above of the wall and supporting bracket according to FIG. 1.

In other words, and as shown in FIG. 3, each of the legs 8 and 9 of the bracket 2 include two spaced portions 10 and 12 which project outwardly from and converge away from the utensil wall 1, a portion 11 which extends between the outer ends of the portions 10 and 12, and portions 7A and 13 respectively provided at the inner ends of the portions 10 and 12 and disposed against the surface of the utensil wall 1. The portions 7A are the ends of the connecting web 7, and the central portion 7B of the connecting web 7 is bent adjacent the portions 7A so as to be spaced from the utensil wall 1. The portion 13 extends toward the inner end of the portion 10 from the inner end of the portion 12, and a corner 14 of the free end thereof is bent away from the utensil wall 1 and is adjacent the portion 10. The portion 11 is roughly parallel to the utensil wall 1 and portion 13, and the portions 10, 11, 12 and 13 thus define a bracket leg of generally trapezoidal shape. The portion 13 extends transversely of the bracket leg 8 and, as best shown in FIG. 1, the lower edge portion thereof projects downwardly beyond the portions 10, 11 and 12 and has a welding projection 3 or 6 thereon.

To weld a utensil to a supporting bracket 2, the latter has simply to be inserted into a welding mould of simple construction. Then the utensil wall is arranged in a suitable position over the supporting bracket, and pressed against the supporting bracket with the use of a tool. The welding operation can be carried out immediately afterwards. Since it is no longer necessary to provide any movable parts in the welding mould, on the one hand the mould can be of simple construction and on the other hand the wear which occurs is reduced to a minimum. Thus, the mould can be constructed as a simple lay-in mould and provided for example with interchangeable weld spot underlays. As a result the working life of the mould is substantially improved, besides the saving of time already mentioned when introducing the supporting bracket. Over and above this, the welding result is considerably improved, since there are no movable mould parts which could impair the welding result.

The height of the legs is so adapted to the recess in the side handle that they are guided in shape-locking manner, or positively, in the side handle, and thus accept the forces which occur when the pot is being handled.

FIGS. 4 and 5 illustrate the mounting of a side handle 15 by means of a supporting bracket 2 constructed according to the invention on a utensil wall 1. The side handle 15 has a recess 16, into which the legs 8, 9 constructed in a box-shape extend. Furthermore, two springs 17 are disposed in this recess, as shown in FIG. 7. Instead of these shapes of springs, a spring may also be used such as is shown in FIG. 8. The rear end 29 of this spring 18 is bent upwards and forms a lateral guide. The front end 19 of each spring 17, 18 is bent downwards and engages in a recess 15A (FIG. 4) in the handle, so that it is locked relative to the handle. The two legs 8, 9 of the supporting bracket 2 engage behind the bulge 20 of the springs 17 or 18. When the side handle 15 is pressed on, these springs 17 or 18 are compressed and after the bulge 20 has been overcome they relax again to a certain extent, so that a force is imparted to the springs which acts upon the said springs in the direction of the utensil wall 1. Since, however, each spring 17 is locked rigidly to the side handle 15 by means of its front end 19, the said side handle is kept pressed against the utensil wall 1 without play by means of this force, so that the handle is disposed without play on the utensil wall. In addition, the surface 21 of the recess 16 of the handle is pressed firmly against the supporting bracket, so as to provide a seating of the supporting bracket 15 without play both vertically and parallel to the utensil wall 1. Furthermore the spring 17 or 18 has a relatively long course when subjected to considerable force, so that even tolerances in manufacturing or enamelling, which are impossible to avoid, have no effect upon the rigid seating of the side handle 15.

As shown in FIGS. 4 and 5, the recess 16 in the handle 15 includes the top surface 21, a bottom surface 24 which is spaced from and faces the top surface 21, and vertical surfaces 25 and 26 which respectively engage side surfaces on the portions 10 and 12 of the bracket leg.

As shown in FIGS. 5 and 7, each spring 17 is generally V-shaped and has 2 arm portions 17A and 17B connected at an apex. The outer end 19 of the arm portion 17A is received in the recess 15A in the handle 15, and the spring 17 extends away from the utensil 1 from the recess 15A. The apex of each spring 17 projects upwardly toward the top surface 21 and can be deflected resiliently downwardly, the outer end of the arm portion 17B being supported on the recess bottom surface 24 and sliding thereon as the apex is deflected. The arm portion 17B of each spring 17 is inclined with respect to the associated bracket leg 8 or 9, as shown in FIG. 5, and engages the lower edge of the portion 11 thereof, thereby urging the upper edges of the bracket leg firmly against the surface 21 and urging the handle 15 firmly toward the utensil wall 1.

FIG. 6 shows that the springs 17 are advantageously connected to one another by means of a central portion 22. This central portion 22 is then, as shown in FIG. 5, locked in a groove 23 in the side handle 15 which extends transversely of the support bracket legs 8 and 9, so that by means of this central portion the forces are transmitted from the spring to the side handle 15. The central portion 22 not only has the advantage that this provides a locking with the side handle 15, but also has the advantage that both springs 17 may be manipulated simultaneously, i.e. that the preliminary assembly of the springs 17 in the side handle is made considerably simpler. Before the side handle is pressed on to the supporting bracket 2, the said springs 17 are inserted in the recesses 16 and the groove 23 and the side handle is then pressed on to the supporting bracket. In addition, the construction of the springs 17, 18 with a bulge 20 makes it possible to remove the side handle 15 without damage. To this end it need only be pulled off from the utensil wall with increased force. This force is gauged such that it is substantially greater than the forces which occur when the pot is being handled. During removal the spring is again compressed and slides through under the legs 8, 9.

I claim:

1. In a handle apparatus for a utensil, including a supporting bracket secured to a wall of said utensil and having a leg projecting away from said utensil, a handle having a recess therein for receiving said leg of said supporting bracket, and retaining means disposed in said handle recess and cooperable with said leg for releasably securing said handle on said utensil, the improvement comprising wherein said leg includes spaced first and second portions projecting outwardly from said utensil wall, a third portion extending between the outer ends of said first and second portions, and fourth and fifth portions respectively provided at the inner ends of said first and second portions and extending along and secured to said utensil wall, said first and second portions converging away from said utensil wall and said third portion being approximately parallel to said utensil wall, whereby said leg is of approximately trapezoidal shape, wherein said supporting bracket includes two said legs and a connecting web which extends therebetween so that said supporting bracket is generally U-shaped, each said fourth portion being a portion of said connecting web and each said fifth portion extending from the inner end of a respective said second portion toward the inner end of a respective said first portion, each said leg being received in said handle recess and said retaining means cooperating with each said leg.

2. The handle according to claim 1, wherein said fifth portion of each said leg extends transversely of said leg to a location beyond at least one of said first, second and third portions thereof and is secured at said location to said utensil wall, and wherein at least a portion of the free end of each said fifth portion is bent away from said utensil wall and is adjacent a respective said first portion.

3. The handle according to claim 2, wherein said support bracket is an elongate, bent strip of sheet metal, and wherein a portion of said connecting web between said fourth sections is bent so as to be spaced from said utensil wall.

4. In a handle apparatus for a utensil, including a supporting bracket secured to a wall of said utensil and having a leg projecting away from said utensil, a handle having a recess therein for receiving said leg of said supporting bracket, and retaining means disposed in said handle recess and cooperable with said leg for releasably securing said handle on said utensil, the improvement comprising wherein said leg includes spaced first and second portions projecting outwardly from said utensil wall, a third portion extending between the outer ends of said first and second portions, and fourth and fifth portions respectively provided at the inner ends of said first and second portions and extending along and secured to said utensil wall, said first and second portions converging away from said utensil wall and said third portion being approximately parallel to said utensil wall, whereby said leg is of approximately trapezoidal shape, wherein said recess in said handle includes a first surface which engages said first and second portions of said support bracket and second and third surfaces which are approximately normal to said first surface and respectively engage said first and second portions of said support bracket, said retaining means urging said handle toward said utensil and said leg against said first surface.

5. The handle according to claim 4, wherein said retaining means includes a generally V-shaped spring having two arm portions connected at an apex, the outer end of one said arm portion being fixed against movement with respect to said handle at a location in said recess spaced from said first surface and said spring extending away from said utensil from said location, said apex of said spring projecting toward and being resiliently deflectable away from said first surface, the outer end of the other arm portion being slidably supported on a surface of said handle which faces said first surface and sliding thereon in response to a deflection of said apex, said second arm portion being inclined with respect to said leg and slidably engaging an edge of said third leg portion of said support bracket.

6. The handle according to claim 5, wherein said support bracket has two said legs, wherein said handle recess includes a said first, second and third surface for each said support bracket leg, wherein said retaining means includes a respective said V-shaped spring for each said leg, wherein said handle includes a further surface in said recess which faces and is spaced from said first surface and includes a groove in said further surface which extends between said locations at which said outer ends of said one arm portions of said springs are fixed against movement relative to said handle, and wherein said retaining means includes a central spring member which connects the outer ends of said one arm portions of said springs and is disposed in said groove, said two springs and said central spring member being respective portions of a single piece of bent spring wire.

* * * * *